United States Patent [19]

Burkit

[11] Patent Number: 4,997,212

[45] Date of Patent: * Mar. 5, 1991

[54] INTERNAL EXPANSION PIPE COUPLING MEMBER

[76] Inventor: John W. Burkit, P.O. Box 19, Kempton, Pa. 19529

[*] Notice: The portion of the term of this patent subsequent to May 22, 2007 has been disclaimed.

[21] Appl. No.: 524,160

[22] Filed: May 16, 1990

Related U.S. Application Data

[63] Continuation-in-part of Ser. No. 335,567, Apr. 18, 1989, Pat. No. 4,927,189.

[51] Int. Cl.$^5$ .............................................. F16L 21/02
[52] U.S. Cl. .................................. 285/109; 285/158; 285/370
[58] Field of Search ............... 285/109, 370, 333, 397, 285/236, 158

[56] References Cited

U.S. PATENT DOCUMENTS

| | | | |
|---|---|---|---|
| 2,303,927 | 12/1942 | Fogg . | |
| 3,141,687 | 7/1964 | Broberg et al. | 285/397 |
| 3,269,754 | 8/1966 | Bertling et al. | 285/109 |
| 3,394,951 | 7/1966 | Crivello | 285/109 |
| 3,514,135 | 5/1970 | Cooper | 285/347 |
| 4,193,173 | 3/1980 | Lorenz . | |
| 4,216,981 | 8/1980 | Jensen | 285/370 X |
| 4,303,103 | 12/1981 | Marks | 285/109 X |
| 4,346,922 | 8/1982 | Ohtsuga et al. | 285/109 |
| 4,464,467 | 9/1984 | Odill et al. | 285/397 X |
| 4,478,434 | 10/1984 | Little | 285/15 |
| 4,491,350 | 1/1985 | Wolf et al. | 285/236 |
| 4,685,704 | 8/1987 | Kolar | 285/370 |
| 4,927,189 | 5/1990 | Burkit | 285/370 X |

FOREIGN PATENT DOCUMENTS

| | | | |
|---|---|---|---|
| 237392 | 12/1964 | Australia | 285/370 |
| 523106 | 1/1956 | Belgium | 285/109 |
| 69098 | 1/1903 | European Pat. Off. | 285/370 |
| 3026681 | 2/1982 | Fed. Rep. of Germany | 265/370 |
| 300739 | 5/1968 | Sweden | 285/370 |
| 317843 | 11/1969 | Sweden | 285/370 |
| 136459 | 3/1930 | Switzerland | 285/370 |

Primary Examiner—Dave W. Arola
Attorney, Agent, or Firm—William B. Noll

[57] ABSTRACT

The combination of a pair of aligned tubular membes joined together in end-to-end relationship, where the tubular members are joined by an internal expansion coupling device. The combination is designed for applications exposed to high operating temperatures and pressures. The combination comprises a tubular member characterized by a flared end portion having a diameter exceeding the diameter of the tubular members. Additionally, there is provided an internal expansion coupling device formed of an elongated open ended tubular joint member consisting of a relatively rigid sheet-like member, where the sheet ends overlap such that the end portions lie essentially contiguous with each other. A compressive seal member is provided between said end portions, and a flexible O-ring type member formed of a high temperature resistant material, is disposed within said flared end portion in contact with the relatively rigid sheet-like member. Finally, means are provided for expanding said sheet-like member whereby said sheet ends may be caused to move circumferentially towards one another to compress said seal member and to urge said O-ring type member against the flared end portion to secure and seal said aligned tubular members.

7 Claims, 4 Drawing Sheets

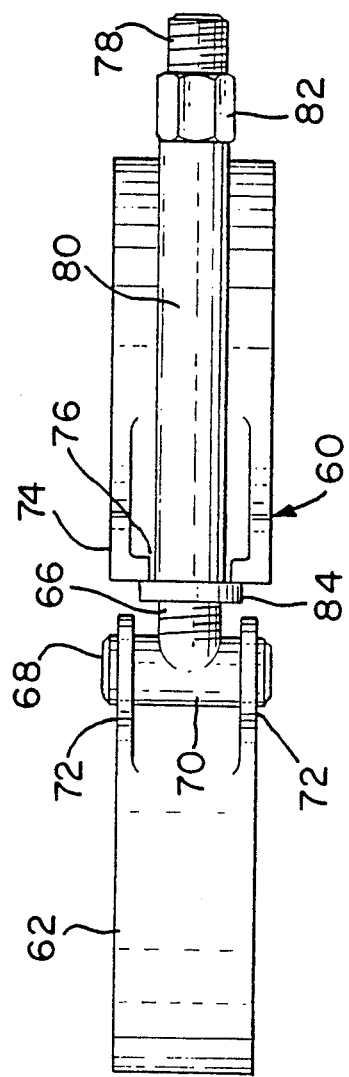
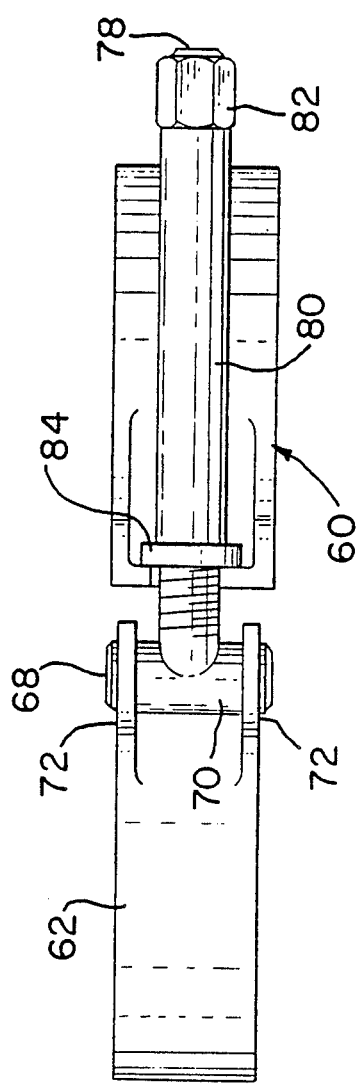
FIG. 7A
FIG. 7B

INTERNAL EXPANSION PIPE COUPLING MEMBER

RELATED APPLICATION

This application is a continuation-in-part of co-pending application Ser. No. 335,567, filed Apr. 10, 1989, and entitled "Internal Expansion Coupling Device", now U.S. Pat. No. 4,927,189.

BACKGROUND OF THE INVENTION

The present invention is directed to an improved internal expansion coupling and sealing system that is particularly adapted for use in a tubular transmission system where high operating temperatures may be a factor or consideration in such transmission system. Further, such coupling and sealing system is especially suited to join opposing tubular members, where the ends thereof are configured to receive an annular type sealing ring which cooperates with the internal expansion member, as hereinafter defined, to effect a tight seal therebetween, even at high temperatures, such as may be associated with internal combustion type engines.

Unlike external or contraction type coupling devices, which are not effective under heat or internal pressure conditions, the present invention is directed to a unique internal coupling device that appears to thrive under pressure while coupling and sealing effectively under heat. There have been attempts by the prior art to make effective internal joint connections. For example, in U.S. Pat. No. 4,478,434 to Little, there is taught a system for coupling adjacent ends of flexible tubular members comprising an elongated open ended tube member having an O.D. that is approximately the same as the I.D. of such flexible tubular members. More particularly, such system includes a transverse slit across said open ended tube member, and a pair of aligned strap-like members having opposite ends thereof connected to said tube members on opposite sides of the slit. Threadable means, as part of the strap-like members, join the opposite ends of the tube member whereby said tube may be contracted a limited amount, or expanded.

Other internal expanding coupling means are taught in U.S. Pat. No. 3,514,135 to Cooper consisting of a split sleeve having oppositely disposed inclined longitudinal flanges which may be radially moved to expand the sleeve; U.S. Pat. No. 3,141,687 to Broberg et al for a steel band splicing strap with a threaded member to separate the strap ends; U.S. Pat. No. 3,394,951 to Crivello for a polyethylene conduit insert consisting of a pair of spaced, axially extending coupling portions and a radially outwardly extending central portion. Each of the coupling portions has a substantially cylindrical internal surface and a pair of opposed frustoconical exterior surfaces tapered at approximately 2° and separated by an annular groove with the portions of the frustoconical surfaces of greatest diameter being adjacent the groove; and U.S. Pat. No. 3,269,754 to Bertling et al, a device similar in operation or function to Crivello.

U.S. Pat. No. 4,469,467 to Odill et al is directed to a flexible sealing member to be used in conjunction with other joining means to prevent water inflow into a manhole. The sealing ring consists of a pair of sealing sections joined together by a pleated section. In operation, only the sealing sections are internally supported by bands, while the pleated section is free to allow for vertical and horizontal movement of the joined components without disturbing the sealing arrangement. U.S. Pat. No. 4,346,922 to Ohtsuga et al is directed to an internally expandable, joint sealing system, that, among certain limitations, is not fully supported throughout the joint. Further, structural features are absent which allow for high temperature, high pressure applications. A further and final prior art coupling member is taught in European Patent application No. 0069098 to Anderson. Such patent teaches a low pressure, expandable, but not contractable, tubular connector for an air ventilation duct. Such joint connector is characterized by a sheet metal element bent into a circular configuration, where the overlapping ends thereof are joined together by a sealing cloth, such as rubber or other resilient materials. Around the periphery of the connector there are provided a pair of non-elastomeric sealing rings held against the periphery by steel bands. Where the ends of such bands overlap, a "weak" spot weld is provided. As taught by such patent, the steel band has a weakened spot weld at the point where the ends of the steel band overlap so that this spot weld can break when the connector is expanded by rotation of a screw.

Certain of the above prior art devices are open to the objections that they create excessive internal diameter restrictions; that they are difficult to manipulate; that they require the use of special skills and or tools to connect and disconnect; that they require strict inside pipe diameter tolerances in order to form a sealed union; that they are lacking in gasket sealing integrity under conditions of high temperature and high pressure; and that they are lacking in flexibility. The pipe coupling member of this invention overcomes those problems of the prior art, while providing a unique coupling and sealing system for high pressure, high temperature applications. The pipe coupling member when in the contracted condition can be readily inserted into the pipe ends, and when in an expanded condition exhibit a minimum restriction while providing an excellent sealed joint. The coupling can be reused in nearly its entirety. Thus, the present invention teaches an internal expansion coupling device which is more versatile than those of the prior art, and is very effective against leaks thereof by its ability to utilize the internal forces or pressures of the medium being transmitted therethrough.

The unique features hereof, particularly those revealing the use of such coupling member under high temperature and high pressure conditions will become apparent from a reading of the detailed description which follows.

BRIEF SUMMARY OF INVENTION

This invention is directed to the combination of a pair of aligned tubular members joined together in end-to-end relationship by an internal expansion coupling member, where the combination may be exposed to high operating temperatures and pressures. The tubular member, such as a pipe, is characterized by an end portion which is flared, such as by an annular channel, with a diameter which exceeds the diameter of the tubular member. The internal expansion coupling member comprises a relatively rigid sheet-like member, where the sheet ends overlap such that the end portions lie essentially contiguous with each other. Between the overlapped end portions a compressive seal member is provided. Additionally, a flexible O-ring type member, formed of a high temperature resistant material, is arranged within said flared end portion in contact with the relatively rigid sheet-like member. Finally, means for expanding the sheet-like member are provided whereby the sheet ends may be caused to move circumferentially towards one another to compress the seal member and to urge the O-ring type member against the flared end portion to secure and seal the aligned tubular members. By this arrangement, a high temperature, high pressure seal is achieved.

BRIEF DESCRIPTION OF THE DRAWINGS

FIGS. 7A and 7B, are top views of a preferred expansion mechanism, showing respectively, the manner of use thereof to effect expansion and contraction of the coupling member.

DETAILED DESCRIPTION OF REFERRED EMBODIMENT

Figure 1:
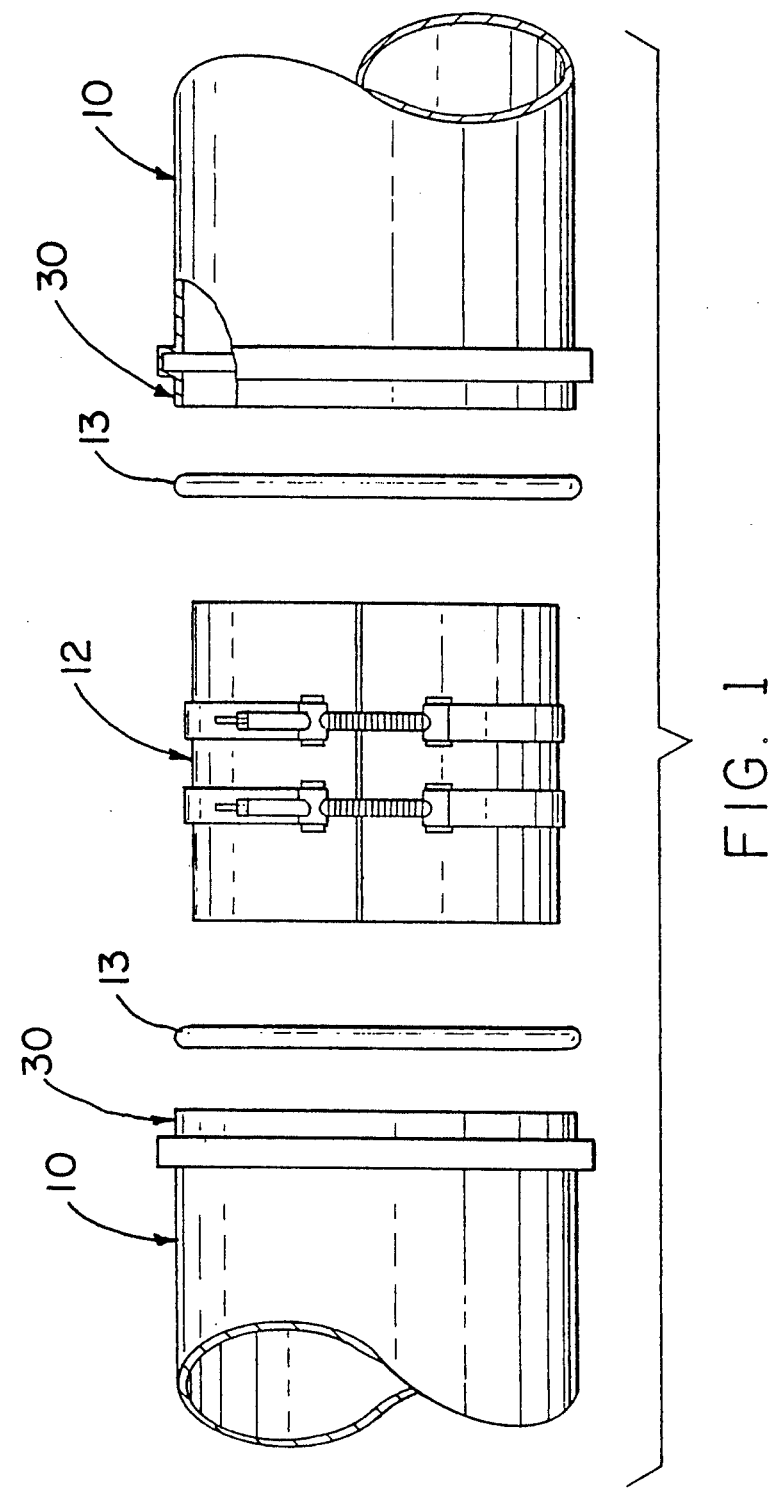
FIG. 1 is an exploded plan view of the combination of this invention showing a pair of aligned tubular members, an internal expansion member, and exemplary sealing O-ring type members for sealing between the tubular wall and internal expansion member.

The present invention is directed to the combination of a pair of aligned tubular members, such as pipe, joined together by an internal expansion coupling member, where high temperature sealing means are provided in combination therewith. FIG. 1 illustrates a preferred embodiment of the combination. Forming integral components of such combination are a pair of aligned tubular members 10, an internal expansion coupling member 12, and a pair of O-ring type members 13 formed of a high temperature resistant material, or materials.

Figure 2A:
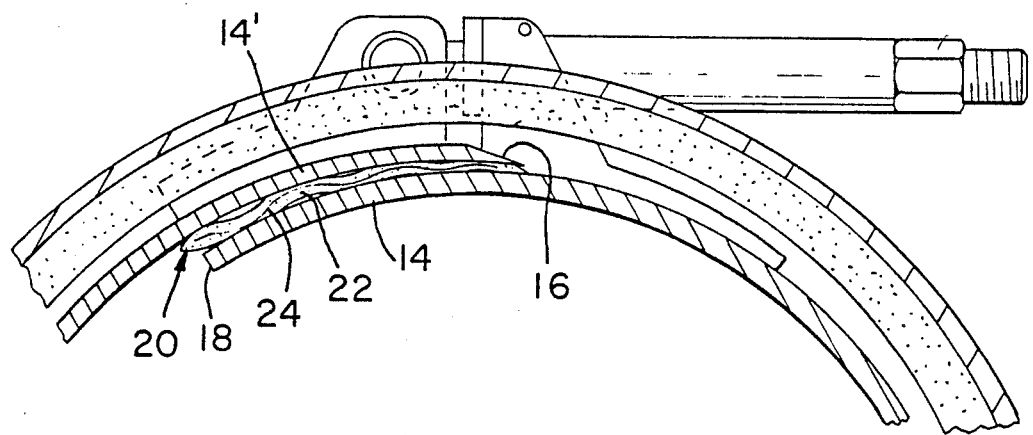
FIGS. 2A and 2B, respectively, are partial, transverse sectional views showing a relaxed position for the coupling member relative to the tubular member, and a fully engaged sealing position.
Figure 2B:
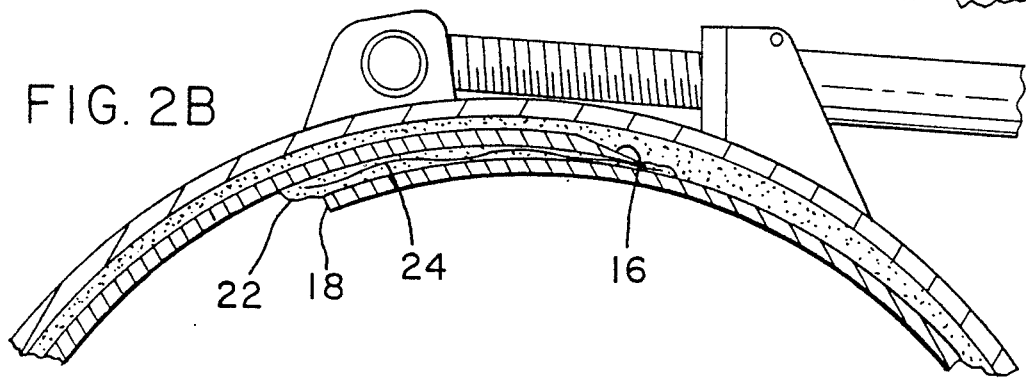

The internal expansion coupling member 12 comprises an open-ended tubular member or expanding sleeve formed from a relatively rigid sheet-like material, such as plastic composite material, or metal, i.e. stainless, high temperature alloys or coated plain carbon steel, into a cylindrical configuration where the sheet ends 14,14' overlap (FIGS. 2A and 2B) and lie essentially contiguous with one another. From the latter Figures in particular, it will be understood that the sheet edges 16,18, in a relaxed state are a predetermined circumferential distance apart. As shown by FIG. 2A, the coupling member 12 is reduced in size by further sliding the ends 14,14' relative to one another so as to increase the circumferential distance between edges 16 and 18. However, as seen in FIG. 2B, the edges 16,18 are brought closer together with the resulting expansion of the coupling 12 by means hereinafter described.

A feature of the coupling member 12 is the provision of a high temperature resistant sealing member 20 interposed between the overlapped sheet ends 14,14'. In the embodiment of FIG. 2A, the sealing member 20 is illustrated as a serpentine configured mat woven from an asbestos or ceramic type covering 22, within which may be provided a metal stiffener or support 24, products suitable at temperatures up to 1400° F., for example. By this combination, the sealing member 20 is resilient while providing some physical integrity. Additionally, as expansion of the sleeve is accomplished, the sealing member 20 is compressed to extend beyond the sheet edges 16,18. As a result, the sealing member fills any gaps which may arise between the sleeve of coupling member 12 and O-ring type member 13. Alternatively, a high temperature resistant polymer, optionally modified with metal or ceramic particles may also be used as the sealing member 20.

Notwithstanding the sealing member 20, the primary seal is achieved by the use of a pair of O-ring type members 13. However, a significant feature hereof is the combination of a flared end 30 in the tubular member 10 which receives the O-ring type member 13. More precisely, the flared end 30, as exemplified by the illustrations in FIGS. 3A, 3B, 4A, 4B, 5A, 5B, 6A and 6B, is designed to be essentially filled by the O-ring type member 13 by pressure exerted thereon by the combination of the expanding coupling member 12 and internal operating pressures.

Figure 3A:
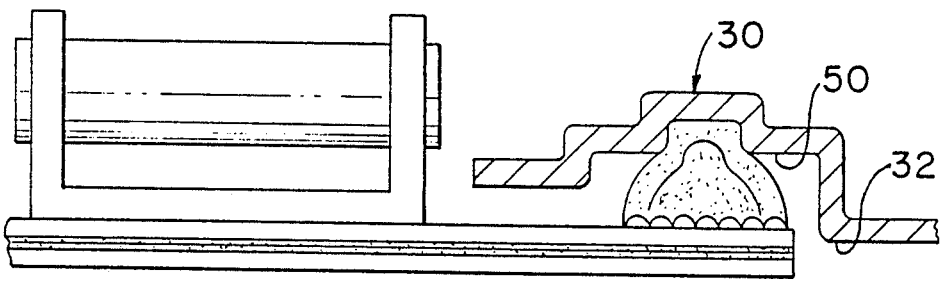
FIGS. 3A and 3B are limited sectional views illustrating one configuration for the flared end of the tubular member, and how the O-ring type member conforms to the flared end before and after expansion of the internal expansion coupling member, respectively.
Figure 4A:
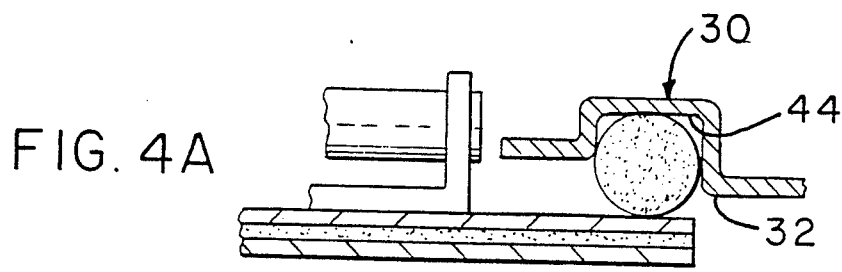
FIGS. 4A and 4B are limited sectional views similar to FIGS. 3A and 3B, illustrating respectively, the positions before and after expansion of the coupling member.
Figure 4B:
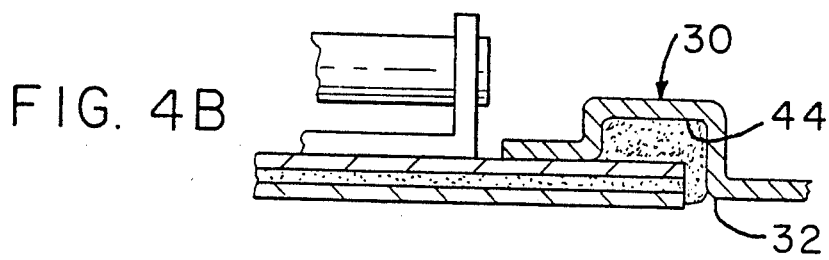
Figure 5A:
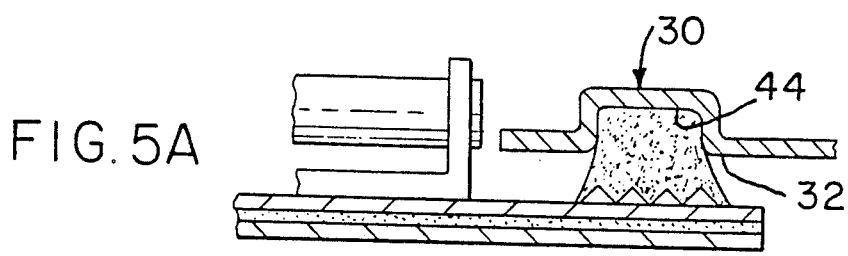
FIGS. 5A and 5B, respectively, are limited sectional views similar to FIGS. 4A and 4B.
Figure 5B:
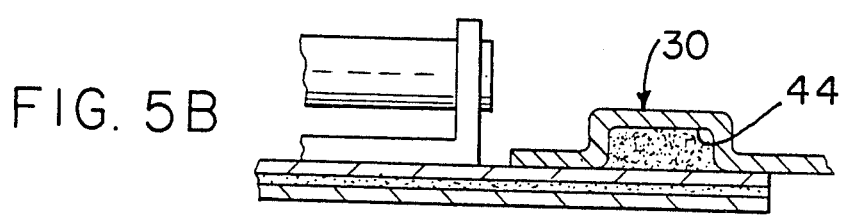
Figure 6A:
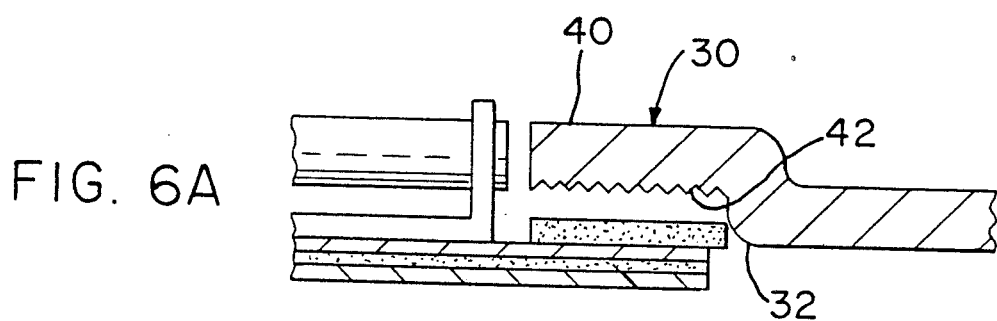
FIGS. 6A and 6B, respectively, are limited sectional views similar to FIGS. 4A and 4B.
Figure 6B:
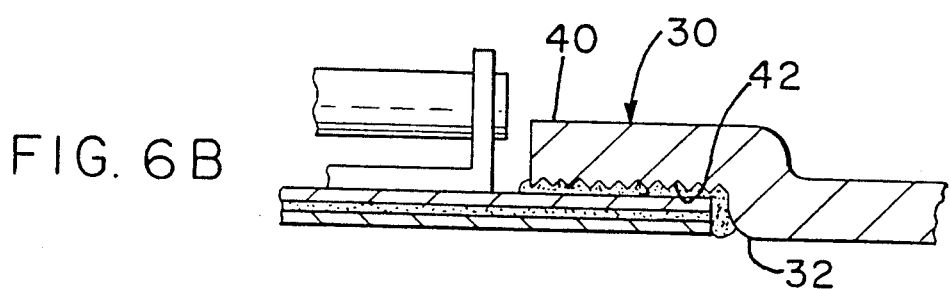

The O-ring type member 14 may take on a variety of shapes or configurations, as shown in FIGS. 3A, 4A, 5A and 6A. In each case, it may be characterized as a continuous loop having the capability to yield and conform under pressure, and comprised of a material or composites which can withstand extreme temperatures, from high to cryogenic. Asbestos 32, with a metal or alloy stiffener 34 therein, see FIG. 3A, is a suitable O-ring type member 14. In this embodiment, the stiffener 34 will yield or flatten to allow the asbestos to conform to the shape of the flared end 30. Another appropriate form of an O-ring type member 13 may be a thin-walled malleable metal tubing containing a suitable yieldable filler, such as neoprene, or the like, while another may be a high temperature polymer, optionally provided with annular ribs as shown in FIG. 5A.

Figure 3B:
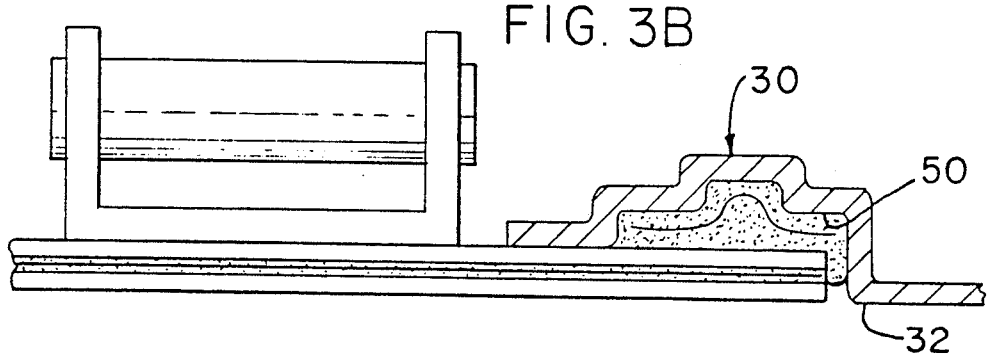

The flared end 30, depending on the design and material for the O-ring type member 13 may comprise a relatively simple shoulder 40 (FIGS. 6A and 6B), which may be provided with plural serrations 42, or roughened surface, to better concentrate the sealing forces of the O-ring type member 14. As shown in FIGS. 4A and 5A, the flared end 30 may be an annular channel 44 having multiple walls, i.e. a minimum of three to provide a confined channel, designed to receive and retain the O-ring type member 13. Alternately, a stepped channel 50, as shown in FIGS. 3A and 3B may be provided at the flared end 30.

The sealing of the joined tubular members of this invention is achieved by the internal expansion coupling member 12 which utilizes the strategically placed sealing member 20 and O-ring type member 13. As most evident in FIGS. 3B, 4B and 6B, the O-ring member 13 is compressed and reshaped within the flared end 30 to fill any gaps which may result between the coupling member 12 and flared end 30 or inner wall 32 of tubular member 12. By preferred means illustrated in FIGS. 7A and 7B, the internal expansion coupling member 12 may be uniformly expanded to apply pressure against such sealing member 20 and O-ring type member 13. An advantage hereof is the ability to apply such internal pressure by external mechanism 60. Such mechanism 60, comprises a first member 62 fixed to, for example, the outer surface of sheet end 14, such as by welding, having at one end 64 a threaded T-bar 66 arranged for pivoting 68 from an engaged i.e. tangential position, to a disengaged or perpendicular position. Specifically, the circular top bar or sleeve 70 is journaled for pivoting action in upstanding wings 72.

Affixed to the other sheet end 14' is a U-shaped member 74 where the opening 76 is sufficient to receive threaded rod 78 and elongated flanged nut 80, the remote end 82 of which is adapted to be turned by a hand tool, well-known in the art. Additionally, a flange 84 is utilized by positioning same to effect expansion of the coupling member 12 (FIG. 7A) or contraction (FIG. 7B). Note that the flange is placed before the U-shaped member 74 for expansion, or behind such member for contraction. By this arrangement, the external mechanism 60 is able to uniformly expand the relatively rigid sheet-like member whereby the sheet edges 16, 8 move toward one another as the coupling member 12 radially expands. This results in a firm but uniformly applied pressure being exerted against the sealing member 20 and O-ring type member 13. While two expanding mechanisms 60 are shown in FIG. 1, it should be understood that a single such device may be used, particularly with small diameter tubular members.

I claim:

1. In combination with a pair of aligned tubular members joined together in end-to-end relationship, where said tubular members are joined by an internal expansion coupling device, where such combination may be exposed to high operating temperatures and pressures, comprising,
   a. a tubular member characterized by a flared end portion having a diameter exceeding its diameter, and
   b. an internal expansion coupling device formed of an elongated open ended tubular joint member consisting of a relatively rigid sheet-like member, where the sheet ends overlap such that the end portions lie essentially contiguous with each other; a compressive seal member between said end portions; a flexible O-ring type member formed of a high temperature resistant material lying within said flared end portion in contact with said relatively rigid sheet-like member; and, means for expanding said sheet-like member whereby said sheet ends may be caused to move circumferentially towards one another to compress said seal member and to urge said O-ring type member against the flared end portion to secure and seal said aligned tubular members.

2. The combination according to claim 1 wherein each said flared end portion includes a multi-walled channel for receiving said O-ring type member.

3. The combination according to claim 1 wherein each said flared end portion includes plural annular serrations or ridges in communication with said O-ring type member.

4. The combination according to claim 1 wherein said compressive seal member, when compressed, extends beyond the edges of said sheet ends in contact with said O-ring type member.

5. The combination according to claim 1 wherein said O-ring type member includes a central metal or alloy stiffener surrounded by a flexible high temperature resistant material.

6. The combination according to claim 1 wherein said O-ring type member, in the expanded condition, is compressed and deformed to fill gaps between said internal expansion coupling device and said flared end portion.

7. The combination according to claim 1 wherein at least one expanding means is provided to cause expansion of said internal expansion coupling device.

* * * * *